United States Patent [19]

Shipley

[11] Patent Number: 4,979,217
[45] Date of Patent: Dec. 18, 1990

[54] PROGRAMMED AUDIO CONTROLLER

[76] Inventor: Robert T. Shipley, 6641 Glen Oaks Way, Oakland, Calif. 94611

[21] Appl. No.: 861,088

[22] Filed: May 8, 1986

[51] Int. Cl.$^5$ ............................................... H04B 3/00
[52] U.S. Cl. .................................................... 381/81
[58] Field of Search ....................... 381/77, 80, 81, 82, 381/85, 123, 24

[56] References Cited

U.S. PATENT DOCUMENTS

| | | | |
|---|---|---|---|
| 2,489,008 | 11/1949 | Callender | 381/80 |
| 3,073,041 | 1/1963 | Haban | 381/77 |
| 3,493,681 | 2/1970 | Richards | 381/81 |
| 4,007,424 | 2/1977 | Gargini | 381/77 |
| 4,239,938 | 12/1980 | Ponto | 381/104 |
| 4,287,580 | 9/1981 | Holzchuh | 367/105 |
| 4,313,208 | 1/1982 | Kavenik | 358/237 |
| 4,359,600 | 11/1982 | Ponto | 381/81 |
| 4,374,363 | 2/1983 | Previti | 381/122 |
| 4,429,187 | 1/1984 | Butcher | 381/80 |
| 4,468,806 | 8/1984 | Gaulden | 381/81 |
| 4,479,240 | 10/1984 | McKinley, Jr. | 381/119 |
| 4,481,660 | 11/1984 | de Konig | 381/81 |
| 4,560,838 | 12/1985 | Meisenheimer | 381/81 |
| 4,635,288 | 1/1987 | Stadius | 381/119 |
| 4,691,361 | 9/1987 | Yoshino | 381/81 |
| 4,862,438 | 8/1989 | Fry | 381/24 |

FOREIGN PATENT DOCUMENTS 1100880  5/1981  Canada .................................. 381/81

OTHER PUBLICATIONS

RCA, Cosmac Microprocessor, 1976.
Lancaster, CMOS Cookbook, 1979, pp. 349-355.
RCA, CD4016 (from "RCA Integrated Circuits"), 1976, pp. 394,395,396,397.
IBM Technical Disclosure Bulletin, vol. 20, No. 3, Aug. 1977, p. 1045, "Trip Detecting Circuit", by M. Ferry.

Primary Examiner—Forester W. Isen
Attorney, Agent, or Firm—Flehr, Hohbach, Test, Albritton & Herbert

[57] ABSTRACT

Controller for use at a listening station in an audio distribution system for selecting a channel of audio programming. The controller has input attenuators for reducing the level of the audio signals, an output amplifier, and a controlled analog switch connected between the attenuators and the amplifier for passing the attenuated audio signal from a selected channel to the output amplifier. The amplifiers have a relatively high imput impedance, and the amplifiers in the distribution system operate at a relatively low power level. The attenuated audio signals are impressed upon a voltage centered in the operating range of the analog switch. In the disclosed embodiment, the analog switch comprises a multiplexer, a counter connected to the address inputs of the multiplexer, and a channel selection switch for applying clock pulses to the counter to step the multiplexer through the audio channels in a predetermined sequence.

12 Claims, 2 Drawing Sheets

PROGRAMMED AUDIO CONTROLLER

This invention pertains generally to audio distribution systems, and more particularly to a controller for selectively applying signals from an audio distribution system to an output transducer.

Audio distribution systems are employed in hospitals and other areas for supplying audio programming to a plurality of listening stations. Several channels of audio programming are generally available on such systems, and selectors are provided at the listening stations for choosing the desired channel. The distribution systems heretofore provided have commonly employed power amplifiers at a central station, with transducers such as loudspeakers at the listening stations. A separate power amplifier is generally required for each channel, and in order to overcome losses in the system and drive all of the loudspeakers, the power amplifiers must be relatively large, e.g. 100–200 watts.

The channel selectors employed in such systems generally step through the audio channels in a predetermined sequence when a channel selection switch is actuated. The selectors heretofore provided have used rotary relays and have had transformers for reducing voltages and matching impedances.

It is in general an object of the invention to provide a new and improved controller for use in an audio distribution system.

Another object of the invention is to provide a controller of the above character which eliminates the need for high power amplifiers and matching transformers.

These and other objects are achieved in accordance with the invention by providing a controller having input attenuators for reducing the level of the audio signals, an output amplifier, and controlled switching means connected between the attenuators and the amplifier for passing the attenuated audio signal from a selected channel to the output amplifier. The attenuators have a relatively high input impedance (e.g. 100 kilo-ohms), and the amplifiers in the distribution system operate at a relatively low power level (e.g. 2–5 watts). The attenuated audio signals are impressed upon a voltage centered in the operating range of the switching means. In the disclosed embodiment, the switching means comprises a multiplexer, a counter connected to the address inputs of the multiplexer, and means including a channel selection switch for applying clock pulses to the counter to step the multiplexer through the audio channels in a predetermined sequence.

Figure 1:
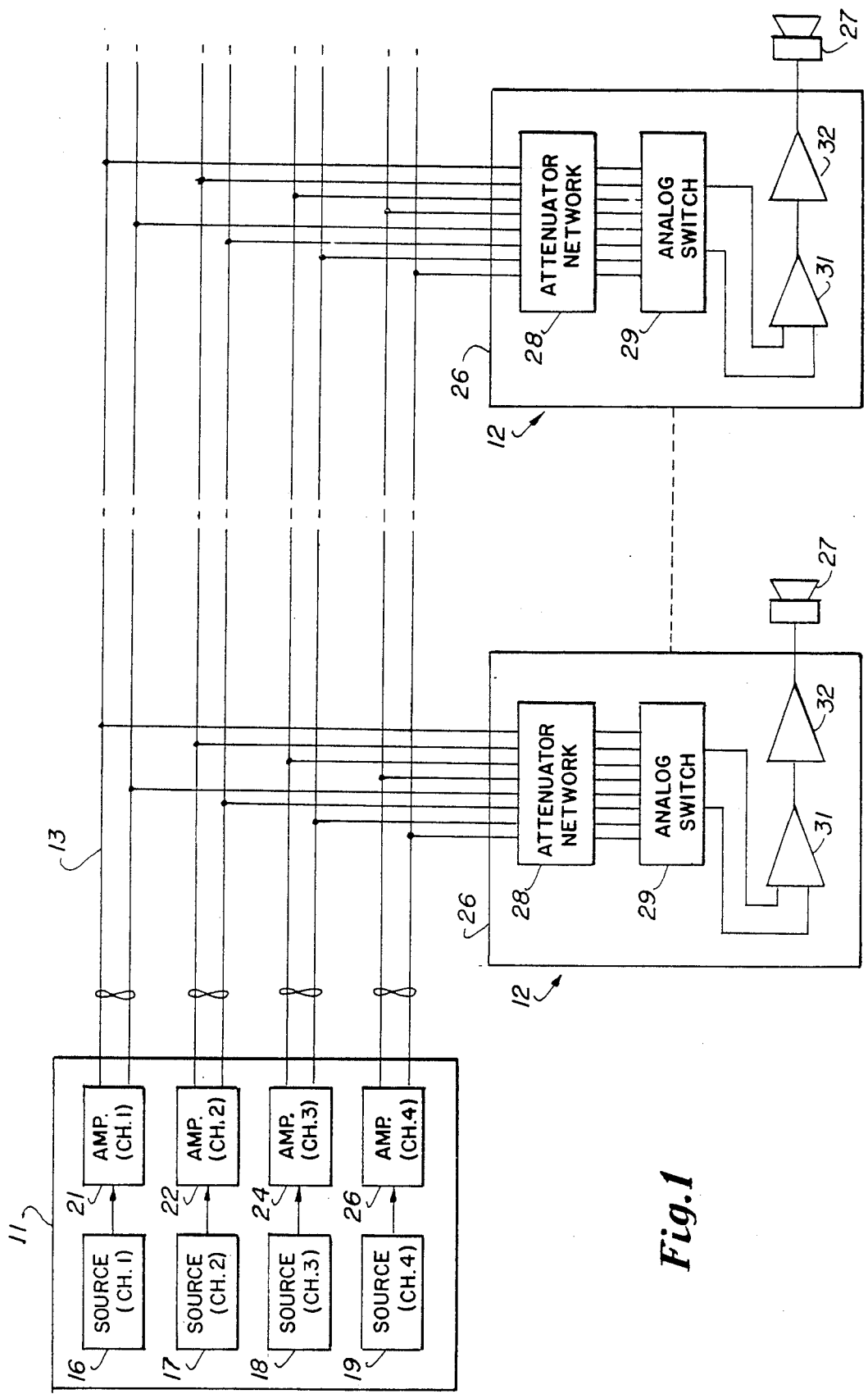
FIG. 1 is a simplified block diagram of one embodiment of an audio distribution system incorporating the invention.

In the audio distribution system illustrated in FIG. 1, four channels of audio programming are supplied by a central station 11 to a plurality of listening stations 12. In a typical hospital installation, for example, the central station can be located at a convenient central location, and the listening stations can be located in the patient rooms. The audio signals are carried by a cable 13 which extends about the facility, with the listening stations being connected to the cable in parallel. In a noisy environment such as a hospital, the wires for the respective channels are preferably arranged in twisted pairs to minimize the noise picked up by the system.

At the central station, signals from sources 16–19 are amplified by amplifiers 21–24 and applied in balanced form to the twisted pairs. The sources can be of any suitable type, including recorded programming and other local programming, as well as broadcast programming. The amplifiers have a power output on the order of 2–5 watts, and the signals applied to the twisted pairs have a level on the order of 25 volts.

At each of the listening stations, a controller 26 is provided for selectively applying the audio signals from the distribution system to an output transducer such as a loudspeaker 27. In a hospital installation, the output transducer may be in the form of a "pillow speaker" at the patient's bedside. Each of the controllers includes an attenuation network 28 which reduces the level of the incoming signals, an analog switch 29 for selectively passing the signal from the desired channel, a differential amplifier 31 for converting the balanced input signal to a single ended signal, and an output amplifier 32 which increases the level of the signal from the differential amplifier to a level suitable for driving the loudspeaker. The attenuation network has an input impedance on the order of 100 kilo-ohms, and the output amplifier has a power output on the order of 2–5 watts. With this relatively high input impedance and the power amplifier at each listening station, it is possible to use relatively small power amplifiers at the central station and relatively small conductors (22 or 24 gauge wire) for the twisted pairs.

Figure 2:
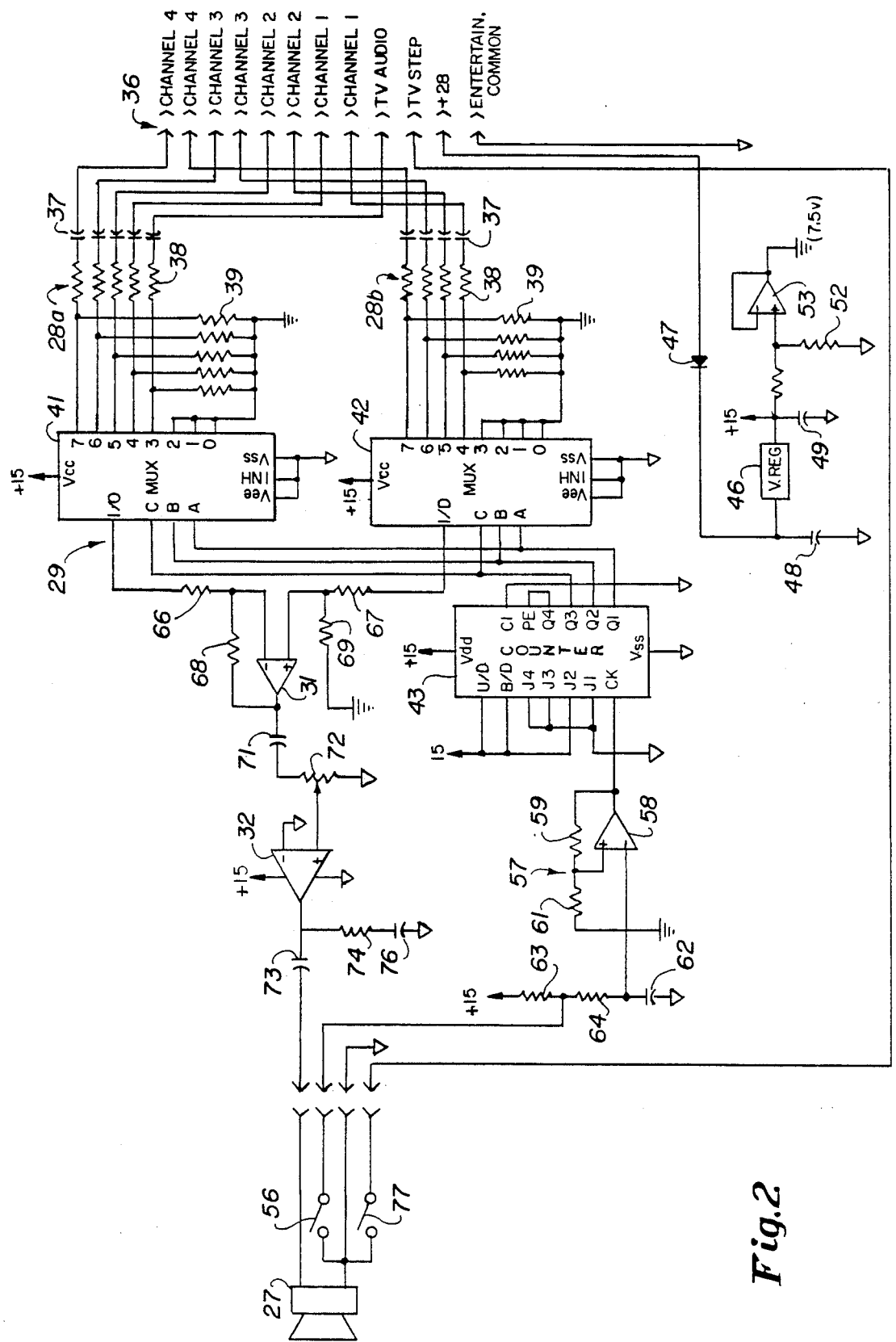
FIG. 2 is a circuit diagram of one embodiment of a controller for use in an audio distribution system such as the embodiment of FIG. 1.

In the controller illustrated in FIG. 2, the controller has input terminals 36 to which the twisted pairs for the four channels of audio programming are connected. This particular controller has a fifth input channel which is used for television audio and a television channel stepping control. Input terminals are also provided for a supply voltage (+28 V) and a common or ground connection.

Attenuator 28 has two sections 28a, 28b to which the respective wires in the twisted pair for each audio channel are connected. Each channel of the attenuator includes a decoupling capacitor 37 and a voltage divider consisting of resistors 38, 39. The values of these resistors are selected to provide a high input impedance and to reduce the incoming signals to levels which can be handled by a solid state analog switch, e.g. 1–3 volts RMS. For the four audio channels, resistors 38 can, for example, have a resistance on the order of 100 kilo-ohms, and resistors 39 can have a resistance on the order of 10 kilo-ohms. The television audio signal is generally present at a lower level than the signals in the four audio channels, and the resistors and attenuator section 28a for the television audio channel are chosen to provide a signal level on the order of 2 volts RMS. Since the television audio is a single ended signal, only one channel of attenuation is required for this signal.

Analog switch 29 comprises a pair of multiplexers 41, 42 controlled by a counter 43. The binary coded decimal outputs of the counter are connected to the address inputs of the multiplexers. Each of the multiplexers has eight input lines and one output line, and the signals passed by the multiplexers are determined by the address signals provided by the counter. The address signals are applied to the multiplexers in parallel, and the attenuator channels for the two wires in each of the twisted pairs are connected to corresponding input lines to provide proper outputs as the multiplexers step through the channels. The attenuated television audio signal is applied only to multiplexer 41, and the corresponding input line of multiplexer 42 is connected to the reference line for the multiplexers. Since the resistances of the multiplexers are at least two orders of magnitude lower than the source impedance, any difference in the resistances of the two multiplexers does not disturb the balance in the audio signals passing through the multiplexers.

Operating power for the multiplexers and the other active elements of the controller is provided by a voltage regulator 46 which is connected to the supply voltage input terminal by a diode 47. An input capacitor 48 and an output capacitor 49 are connected to the voltage regulator, and in the embodiment illustrated, the voltage regulator provides an operating voltage of +15 volts.

Means is provided for centering the attenuated audio signals in the operating range of the multiplexers. This means includes a voltage divider consisting of resistors 51, 52 and a unity gain amplifier 53. In the embodiment illustrated, resistors 51 and 52 have equal values, and the voltage at the output of amplifier 53 is 7.5 volts, one-half of the operating voltage. The voltage dividers in the attenuator network are referenced to this voltage, and the attenuated input signals are thus superimposed upon this reference voltage. This reference voltage is also applied to the unused input lines of the multiplexers, including the common line for the television audio signal.

Means is provided for applying clock pulses to counter 43 to change the output state of the counter and thereby step the multiplexers through the input channels. This means includes an audio channel selector switch 56 and a comparator 57 connected to the clock input of the counter. The selector switch is a normally open pushbutton switch which can be mounted in a convenient location near the pillow speaker. The comparator comprises a differential amplifier 58 having a positive feedback resistor 59 connected between its output and non-inverting input terminals. The non-inverting input terminal is also connected to the 7.5 reference voltage source by a resistor 61. A capacitor 62 is connected between the inverting input terminal and ground, and this capacitor is charged from the 15 volt source through resistors 63, 64. One side of the channel selection switch is connected to the junction of resistors 63 and 64, and the other side of this switch is grounded.

When switch 56 is open, the voltage at the inverting input of amplifier 58 is higher than the voltage at the non-inverting input, and the output of the comparator is low. When switch 56 is closed, capacitor 62 discharges through resistor 64 and switch 56, and when the voltage on the capacitor drops below the voltage at the non-inverting input, the comparator fires, delivering a clock pulse to the counter. The clock pulse is terminated when switch 56 is released and capacitor 62 again charges to a little greater than the voltage at the non-inverting input terminal. As long as the comparator remains in an on state, further closures of switch 56 cannot produce additional clock pulses, and the switch is thus effectively debounced by the comparator. The Q4 output of the counter is connected to the preset enabling input so that the counter is returned to a zero output state after it reaches a count of 7 (0111 binary).

The output lines of multiplexers 41, 42 are connected to the inputs of differential amplifier 31 by resistors 66, 67. A gain setting resistor 68 is connected between the output and the inverting input of this amplifier, and a resistor 69 is connected between the non-inverting input and the 7.5 volt reference voltage for the audio signals. The differential amplifier converts the balanced audio signal to a single ended signal and adjusts this signal to a level suitable for driving output amplifier 32.

The output of differential amplifier 31 is connected to the non-inverting input of output amplifier 32 by a coupling capacitor 71 and a volume control potentiometer 72. The inverting input of amplifier 32 is connected to ground. The output of amplifier 32 is connected to loudspeaker 27 by a coupling capacitor 73, and a low pass filter consisting of a resistor 74 and a capacitor 76 is connected to the output of amplifier 32 to reduce parasitic oscillations when driving an inductive load such as a speaker. Amplifier 32 can be any small audio amplifier (e.g. 2-5 watts) suitable for driving loudspeaker 27.

A switch 77 for controlling the selection of television channels is also mounted near the pillow speaker. This switch comprises a normally open pushbutton switch which is connected to the input terminal for the television stepping control.

Operation and use of the invention is as follows. It is assumed that an audio distribution system as illustrated in FIG. 1 has been installed in a hospital and that a program selector as illustrated in FIG. 2 has been installed in each patient room. A patient can select any one of the four audio programming channels or the television audio channel by depressing selector switch 56 until the desired channel is received. Switch 56 can be depressed and released repeatedly to provide successive clock pulses. Each time a clock pulse is generated, counter 43 advances one count, incrementing the address signals applied to multiplexers 41, 42. The multiplexers pass the attenuated audio signal for the selected channel, and this signal is amplified by amplifiers 31, 32 and applied to loudspeaker 27. The volume of the output sound can be adjusted with potentiometer 72. The television channels can be selected in stepwise fashion by depressing switch 77.

The invention has a number of important features and advantages. By having distributed amplification at each listening station, the need for large power amplifiers is eliminated, and small inexpensive amplifiers can be used in the distribution system. The high input impedance of the attenuator network permits smaller conductors to be used in the audio cable without undue loss of the audio signals. Superimposing the attenuated audio signals on a voltage centered in the operating range of the analog switch provides more efficient operation of the switch. The audio signals are transmitted in a balanced mode with minimizes noise pickup, and the output sound level can be adjusted independently at each listening station. It requires no transformers and no relays, and it maintains a high degree of common mode noise reduction.

It is apparent from the foregoing that a new and improved audio distribution system and program selector have been provided. While only certain presently preferred embodiments have been described in detail, as will be apparent to those familiar with the art, certain changes and modifications can be made without departing from the scope of the invention as defined by the following claims.

I claim:

1. In a system for distributing audio signals from a central station to a plurality of listening stations at different locations within a building: a plurality of twisted paris extending between the central station and the different locations, audio amplifiers having a power output on the order of 2-5 watts connected to the twisted pairs at the central station for applying audio signals from different channels to respective ones of the twisted pairs, and a controller at each of the listening stations for selecting the signals to be heard at the different stations, each of said controllers comprising an attenuator having an input impedance on the order of 100,000 ohms connected to the twisted pairs for reducing the level of the audio signals from the twisted pairs, an output amplifier having a power output on the order of 2-5 watts, and switching means connected between the attenuator and the output amplifier for selectively passing the attenuated audio signals from one of the channels to the output amplifier.

2. In a system for distributing audio signals from a central station to a plurality of listening stations at different locations within a building: a plurality of conductors extending between the central station and the different locations, audio amplifiers connected to the conductors at the central station for applying audio signals from different channels to respective ones of the conductors, and a controller at each of the listening stations for selecting the signals to be heard at the different stations, each of said controllers comprising an attenuator network connected to the conductors for reducing the level of the audio signals from the conductors, an output amplifier, a multiplexer connected between the attenuator network and the output amplifier for selectively passing the attenuated audio signals from different ones of the channels to the output amplifier, a counter connected to the control lines of the multiplexer, and means including a channel selection switch for applying clock signals to the counter to step the multiplexer through the audio channels in a predetermined sequence when actuated.

3. In a controller for use at a listening station in an audio distribution system having conductors arranged in balanced pairs for carrying different channels of audio signals: an attenuator network connected to the conductors for reducing the level of the audio signals from the conductors, an output amplifier, controlled switching means connected between the attenuator network and the output amplifier for selectively passing the attenuated audio signals from different ones of the channels to the output amplifier, and a differential amplifier connected between the switching means and the output amplifier for converting a balanced signal from the switching means to a single ended signal for application to the output amplifier.

4. In a system for distributing audio signals from a central station to a plurality of listening stations at different locations within a building: a plurality of conductors extending between the central station and the different locations, audio amplifiers connected to the conductors at the central station for applying audio signals from different channels to respective ones of the conductors, and a controller at each of the listening stations for selecting the signals to be heard at the different stations, each of said controllers comprising an attenuator network connected to the conductors for reducing the level of the audio signals from the conductors, an output amplifier, controlled switching means which operates between two voltages of predetermined level for selectively passing the attenuated audio signals from different ones of the channels to the output amplifier, and means for superimposing the attenuated audio signals on a voltage midway between the two voltages of predetermined level for application to the switching means.

5. In a system for distributing audio signals from a central station to a plurality of listening stations at different locations within a building: a plurality of twisted pairs extending between the central station and the different locations, audio amplifiers having a power output on the order of 2-5 watts connected to the twisted pairs at the central station for applying audio signals from different channels to respective ones of the twisted pairs, and a controller at each of the listening stations for selecting the signals to be heard at the different stations, each of said controllers comprising an attenuator network connected to the twisted pairs for reducing the level of the audio signals from the twisted pairs, an output amplifier having a power output on the order of 2-5 watts, and controlled switching means connected between the attenuator network and the output amplifier for passing the attenuated audio signals from successive ones of the channels tot he output amplifier upon successive actuations of said switching means.

6. In a controller for use at a listening station in an audio distribution system having a plurality of twisted pairs of conductors carrying audio signals from a central station to a plurality of listening stations: first and second groups of attenuators of relatively high input impedance to which respective conductors in each of the twisted pairs are connected, first and second multiplexers connected to the outputs of the first and second groups of attenuators, a differential amplifier connected to the outputs of the multiplexers, an output amplifier connected to the output of the differential amplifier, a counter connected to the multiplexers, and means including a channel selection switch for applying clock pulses to the counter to condition the multiplexers to pass the audio signals from a successive one of the twisted pairs each time the channel selection switch is actuated.

7. The controller of claim 6 wherein each of the attenuators has an input impedance on the order of 100 kilo-ohms.

8. The controller of claim 6 including means for supplying an operating voltage of predetermined level to the multiplexers, and means for applying a reference voltage on the order of one-half of the operating voltage to the attenuators so that the output signals from the attenuators are centered in the operating range of the multiplexers.

9. In an audio distribution system: a plurality of twisted pairs of conductors extending from a central station to a plurality of listening stations; means including an amplifier having a power output on the order of no more than about 2-5 watts connected to each of the twisted pairs at the central station for applying audio signals to the conductors; and a controller at each of the listening stations comprising attenuators of high input impedance for reducing the level of the signals from the twisted pairs, an output amplifier, controlled switching means connected between the attenuators and the output amplifier for selectively passing an attenuated audio signal from one of the twisted pairs, and differential amplifier means connected between the switching means and the output amplifier for applying the selected signal to the output amplifier.

10. The system of claim 9 wherein each of the attenuators has an input impedance on the order of 100 kiloohms.

11. The system of claim 9 wherein the switching means comprises a multiplexer, a counter connected to the address inputs of the multiplexer, and means including a manually actuated channel selection switch for applying clock pulses to the counter to advance the count and thereby condition the multiplexer to pass the signal from a selected one of the twisted pairs each time the channel selection switch is actuated.

12. The system of claim 9 wherein the controlled switching means operates between two voltages of predetermined level, and the controller at each listening station includes means for superimposing the attenuated audio signals on a voltage midway between the two voltages of predetermined level.

* * * * *